UNITED STATES PATENT OFFICE.

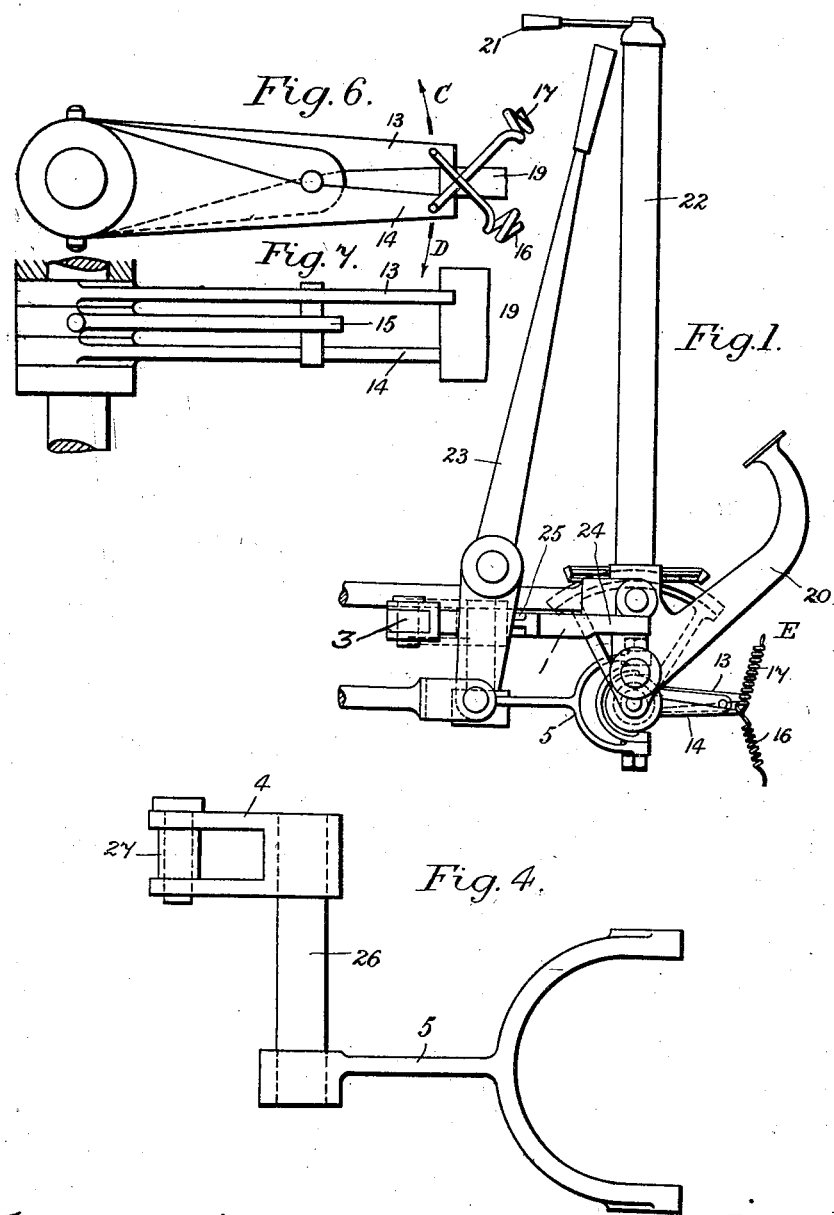

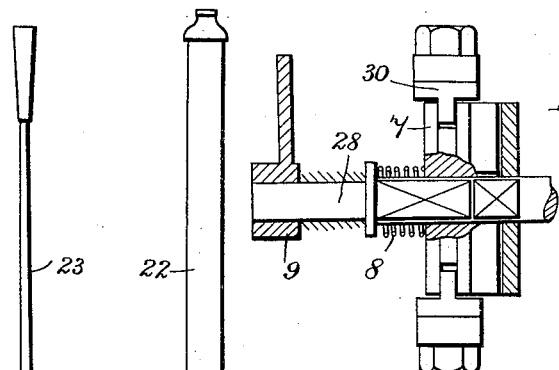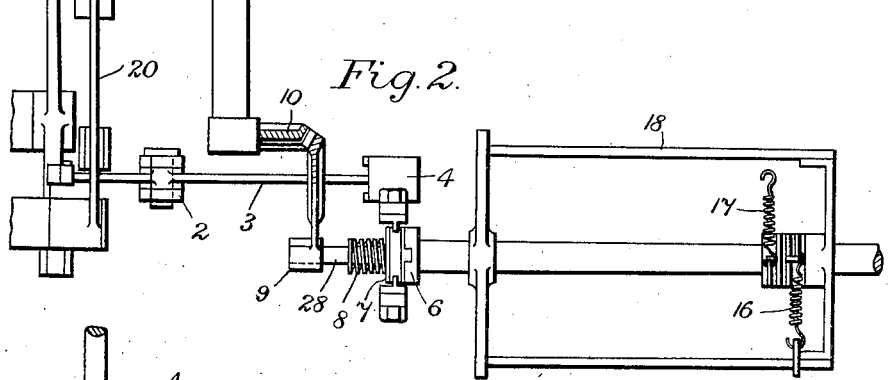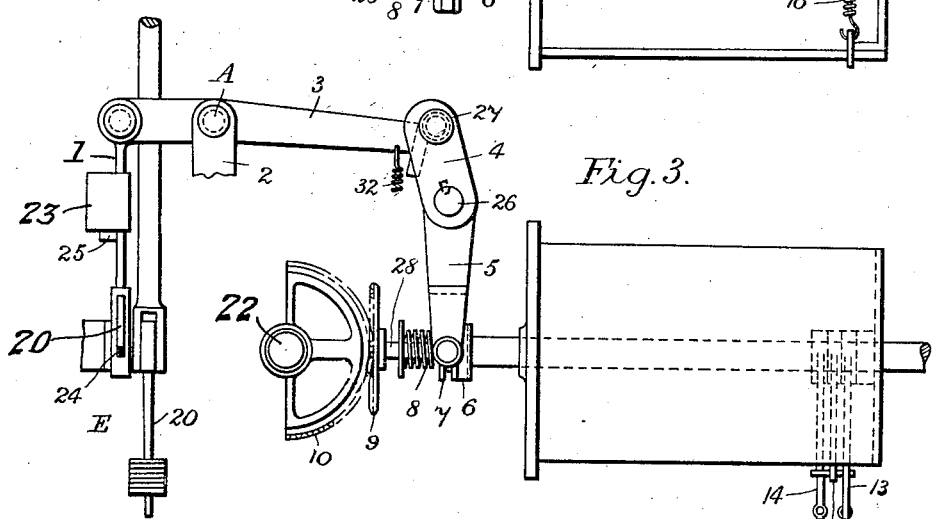

FRANK GARRETT, JR., AND HARRY KEAY PRATT, OF LEISTON, ENGLAND, ASSIGNORS TO RICHARD GARRETT & SONS LIMITED, OF NEW HAVEN, ENGLAND.

SAFETY CONTROLLING-GEAR FOR ELECTRICALLY-PROPELLED VEHICLES.

1,323,179.　　　　　　　Specification of Letters Patent.　　Patented Nov. 25, 1919.

Application filed June 18, 1917. Serial No. 175,484.

*To all whom it may concern:*

Be it known that we, FRANK GARRETT, Jr., and HARRY KEAY PRATT, subjects of the King of Great Britain, managing director of Richard Garrett & Sons Limited, of New Haven, Leiston, Suffolk, England, engineers, and of Chalfonts, Waterloo avenue, engineer, Leiston aforesaid, respectively, have invented certain new and useful Improvements in Safety Controlling-Gears for Electrically-Propelled Vehicles, of which the following is a specification.

This invention relates to safety controlling gear for electrically propelled vehicles and has for its primary object to provide a device which will prevent the driver from starting the vehicle or damaging the battery or motor, with the brake or brakes applied.

A safety controlling gear made in accordance with this invention comprises means whereby directly a brake is being applied the controller shaft is disconnected and the controller is caused to return automatically to the neutral position.

The means for automatically releasing the controller may consist of levers fitted to the brake lever or levers and adapted to disconnect a clutch on the controller shaft and allow the spring actuated controller drum to return to the neutral position.

The invention will now be described with reference to the accompanying drawings which show detail views of one form of controlling gears made in accordance with this invention.

Figure 1 is a side elevation, Fig. 2 is a front elevation, Fig. 3 is a plan, Fig. 4 is a plan of the de-clutching lever, Fig. 5 is a sectional elevation of the clutch, Fig. 6 is an elevation of the controller levers and Fig. 7 is a plan of same.

20 and 23 are the foot brake and hand brake levers respectively; 3 is a specially designed lever pivoted at A to the bar 2, to one end of which the link 1 is fixed, the other end being provided with a cam shaped face as shown in the drawing. The link 1 receives its motion from either hand or foot brake lever in one direction in opposition to pull of spring 32, which returns lever 3 to its original position when the brake levers are released.

The means adopted in order to actuate this gear through link 1 is as follows:—In the case of the foot lever, a small tongue piece 24, which operates in the slot provided in link 1, engages one end of the slot, and draws the link in a direction in opposition to the action of the spring 32, while the hand lever 23 engages with the lug 25 attached to link 1 and draws it or forces it in the same direction. The slot provided in link 1 acting in conjunction with the tongue piece 24 forms a guide, and at the same time allows either brake lever to be operated entirely independently.

One end of lever 3, which is provided with a cam shaped face, engages with a roller 27 mounted on a lever 4. This lever is keyed to one end of a shaft 26, and to the other end a second lever 5 is keyed. Lever 5 is forked at one end to receive a cod piece 30, which engages with the half clutch 7. This half clutch is arranged to slide on the square portion of the spindle 28 against the action of spring 8 while the other half clutch 6 is keyed rigidly to the controller shaft.

On to the controller shaft are threaded three levers, 13, 14 and 15. 13 and 14 are loose on the shaft, while 15 is keyed securely thereto. Through the end of lever 15 a pin is fixed which engages the two levers 13 and 14. Furthermore, a stop 19 is provided thus preventing lever 13 from traveling in the direction of arrow D beyond this stop, and lever 14 from traveling in direction of arrow C beyond the stop 19. Springs 16 and 17 are provided, which act against the movement of these levers.

When the handle 21 is turned in either direction, the motion is transmitted through the pillar 22 and the bevel wheels 9 and 10 and clutch 6 and 7 to the controller drum. The controller drum may rotate in the direction of either C or D, and will carry one of the levers 13 or 14 with it, depending upon the direction of rotation, thus putting tension on one or other of the springs 16 or 17, the rotation in one direction being for forward traveling, and in the other for backward traveling of vehicles.

On depressing the foot brake lever 20, or pulling the hand brake lever 23, the link 1 is pulled in a direction in opposition to the action of the spring 32, which swings the lever 3 around its fulcrum A, while the cam shaped face of the other end of lever 3 which engages with the roller 27 on lever 4, throws the half clutch 7 out of gear with the other half 6. This releases the controller drum which is returned to the neutral position by one of the springs 16 or 17 until the lever 13 or lever 14 comes into contact with the stop 19, and is thus prevented from further turning. The controller drum 18 remains in this position, i. e., the neutral position, and the motor is thus automatically switched out of circuit.

The brakes must be released before the motor can be started again; and the handle 21 must be placed into neutral position carrying the half clutch 7 with it, when the claw on 7 falls into the slot in 6 and the controller is again in position for starting.

If either or both brake levers are on and the handle 21 rotated to the neutral position, the clutch will not fall into gear with the controller.

With a safety controlling gear made in accordance with this invention, the driver is prevented from starting the vehicle with the brakes on. Any damage is prevented from being done to the battery or motor through attempting to start with the brakes applied. The controlling handle must be returned to the neutral position after either brake has been applied, before the vehicle can be started again, and the brakes must be released before it is possible to operate the controller.

What we claim is:—

1. Control means for vehicles comprising a controller for the motive agent, means for setting the controller, brake-applying means, and means controlled by the brake means for rendering the controller inoperative relatively to its setting means while the brake means is in brake-applying position.

2. Control means for vehicles comprising a controller for the motive agent, said controller having means for setting it in running position, means acting to restore the controller to non-running position, brake-applying means, and means governed by the brake-applying means and operative to render the setting means inactive relatively to the controller and to render active said restoring means and thus cause the controller to be restored to non-running position when said brake-applying means is set in brake-applying position.

3. Control means for vehicles comprising a controller for the motive agent, means acting to restore the controller to non-running condition, means for actuating the controller, brake-applying means, and means governed by the brake-applying means for connecting and disconnecting said actuating means with respect to the controller.

4. Control means for vehicles comprising a controller for the motive agent, means acting to restore the controller to non-running condition, means for actuating the controller, brake-applying means, and means including a clutch controlled by the brake-applying means for connecting and disconnecting said actuating means with respect to the controller.

5. Controlling means for electrically-propelled vehicles of the type having a controller for the motive power and a brake member for setting the brakes thereof, comprising means tending to restore the controller to non-running position, means adapted to be operatively connected to the controller for setting the controller in running position, and means controlled according to the position of the brake member for governing the operative connection between the controller and said setting means.

6. Control means for electrically propelled vehicles comprising a controller for the motive current, said controller having actuating means therefor and also means always acting to restore it to non-running condition, brake-applying means, and means including a clutch governed by the brake-applying means for connecting and disconnecting said actuating means with respect to the controller.

In testimony whereof we have hereunto set our hands in presence of two subscribing witnesses.

FRANK GARRETT, Jr.
HARRY KEAY PRATT.

Witnesses:
REGINALD C. WEAVER,
FREDK. WM. SMITH.